United States Patent
Pfeiffer

(10) Patent No.: US 9,630,650 B2
(45) Date of Patent: Apr. 25, 2017

(54) DEVICE FOR CAMBER AND/OR TOE ADJUSTMENT OF A VEHICLE WHEEL

(71) Applicant: AUDI AG, Ingolstadt (DE)

(72) Inventor: Ulrich Pfeiffer, Karlskron/Probfeld (DE)

(73) Assignee: AUDI AG, Ingolstadt (DE)

( * ) Notice: Subject to any disclaimer, the term of this patent is extended or adjusted under 35 U.S.C. 154(b) by 37 days.

(21) Appl. No.: 14/892,951

(22) PCT Filed: Apr. 24, 2014

(86) PCT No.: PCT/EP2014/001098
§ 371 (c)(1),
(2) Date: Nov. 20, 2015

(87) PCT Pub. No.: WO2014/187525
PCT Pub. Date: Nov. 27, 2014

(65) Prior Publication Data
US 2016/0167709 A1   Jun. 16, 2016

(30) Foreign Application Priority Data

May 21, 2013   (DE) .......................... 10 2013 008 652

(51) Int. Cl.
| B62D 17/00 | (2006.01) |
| B60G 7/00 | (2006.01) |
| F16D 41/10 | (2006.01) |

(52) U.S. Cl.
CPC ............. *B62D 17/00* (2013.01); *B60G 7/006* (2013.01); *F16D 41/105* (2013.01);
(Continued)

(58) Field of Classification Search
CPC .... B62D 17/00; B60G 7/006; B60G 2200/46; B60G 2200/4622; B60G 2202/42
See application file for complete search history.

(56) References Cited

U.S. PATENT DOCUMENTS 6,257,604 B1 *   7/2001   Laurent .................... B60G 3/01
                                                                267/68
7,464,801 B2   12/2008   Wittkopp
(Continued)

FOREIGN PATENT DOCUMENTS

CN   102458965   5/2012
CN   102656031   9/2012
(Continued)

OTHER PUBLICATIONS

International Search Report issued by the European Patent Office in International Application PCT/EP2014/001098.
(Continued)

*Primary Examiner* — Faye M Fleming
(74) *Attorney, Agent, or Firm* — Henry M. Feiereisen LLC

(57) ABSTRACT

A device for adjusting camber and/or toe of a vehicle wheel includes a rotatable actuating element arranged between a wheel-side carrier part of a wheel carrier and an axle-side guide part thereof and adjustable by a rotary drive unit. A double-acting freewheel is disposed in a driving path between the rotary drive unit and the actuating element and configured to assume a release position in which the driving path is enabled for transmission of a driving torque from the rotary drive unit onto the actuating element, and to assume a locking position in which a locking torque is generated in opposition to a reaction torque directed from the actuating element to the rotary drive unit. The freewheel is constructed to open in the presence of the driving torque generated by the rotary drive unit and closes in the presence of the reaction torque generated by the actuating element.

14 Claims, 6 Drawing Sheets

(52) U.S. Cl.
CPC .... *B60G 2200/46* (2013.01); *B60G 2200/462* (2013.01); *B60G 2200/4622* (2013.01); *B60G 2202/42* (2013.01); *B60G 2202/442* (2013.01); *B60G 2204/40* (2013.01); *B60G 2204/414* (2013.01); *B60G 2204/419* (2013.01); *B60G 2204/46* (2013.01); *B60G 2204/62* (2013.01); *B60G 2206/50* (2013.01)

(56) References Cited

U.S. PATENT DOCUMENTS

| | | | |
|---|---|---|---|
| 8,322,729 | B2* | 12/2012 | Michel .................. B60G 7/006 280/5.52 |
| 2007/0080513 | A1* | 4/2007 | Osterlanger ............ B60G 3/26 280/86.751 |
| 2007/0163853 | A1 | 7/2007 | Wittkopp |
| 2010/0072714 | A1 | 3/2010 | Schmid |
| 2010/0109264 | A1 | 5/2010 | Kossira |
| 2013/0249252 | A1 | 9/2013 | Schmid et al. |
| 2014/0028007 | A1 | 1/2014 | Pfeiffer et al. |
| 2016/0221408 | A1* | 8/2016 | Niggemeyer .......... B60G 7/008 |

FOREIGN PATENT DOCUMENTS

| | | |
|---|---|---|
| CN | 102741071 | 10/2012 |
| DE | 635 474 | 9/1936 |
| DE | 41 41 160 A1 | 6/1993 |
| DE | 44 47 480 | 6/1996 |
| DE | 195 81 436 C1 | 2/2000 |
| DE | 10 2005 023 250 A1 | 11/2006 |
| DE | 10 2007 002 142 A1 | 8/2007 |
| DE | 10 2007 054 823 A1 | 5/2009 |
| DE | 10 2008 048 569 A1 | 3/2010 |
| DE | 10 2008 052 161 A1 | 5/2010 |
| DE | 10 2009 021 477 A1 | 11/2010 |
| DE | 10 2009 031 344 A1 | 1/2011 |
| JP | 57079334 | 11/1983 |

OTHER PUBLICATIONS

Chinese Search Report issued on Sep. 13, 2016 with respect to counterpart Chinese patent application 201480029209.9.
Translation of Chinese Search Report issued on Sep. 13, 2016 with respect to counterpart Chinese patent application 201480029209.9.

* cited by examiner

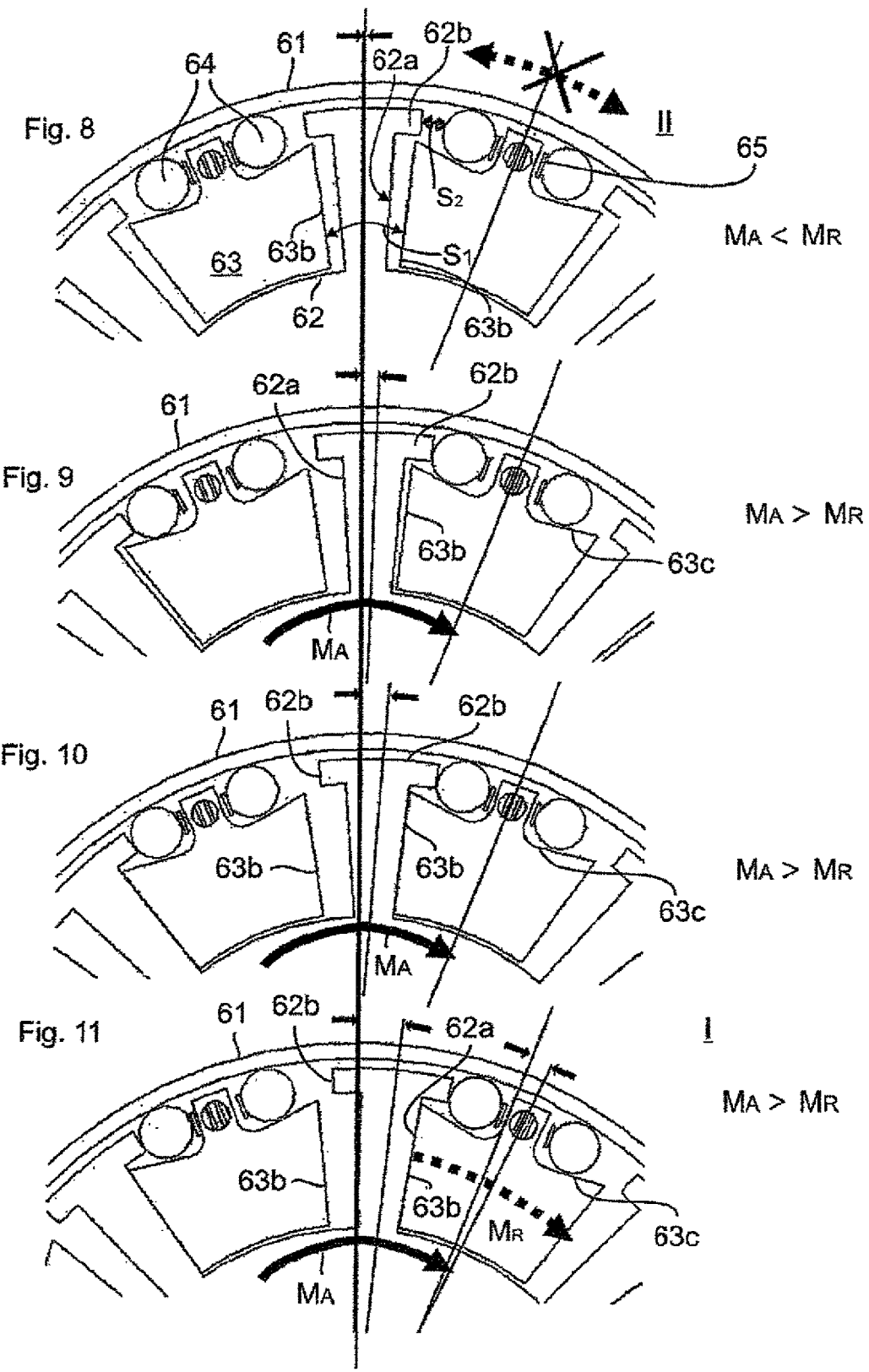

DEVICE FOR CAMBER AND/OR TOE ADJUSTMENT OF A VEHICLE WHEEL

CROSS-REFERENCES TO RELATED APPLICATIONS

This application is the U.S. National Stage of International Application No. PCT/EP2014/001098, filed Apr. 24, 2014, which designated the United States and has been published as International Publication No. WO 2014/187525 and which claims the priority of German Patent Application, Serial No. 10 2013 008 652.3, filed May 21, 2013, pursuant to 35 U.S.C. 119(a)-(d).

BACKGROUND OF THE INVENTION

The invention relates to a device for adjusting camber and/or toe of a vehicle wheel of a motor vehicle.

In a generic motor vehicle with a wheel suspension, the rotary parts of an actuating member are determinative for the camber and/or toe of the vehicle wheel and adjusted via actuators (for example a spur gear mechanism) and electric motors in both rotation directions in opposite directions or in same direction. However, it must be ensured that reaction torques from the dynamic or static wheel loads do not cause unwanted adjustment. Such reaction torques are transmitted by the rotary parts of the actuating element via a gear stage to a drive motor. This means that the drive motor is required to continuously provide a counter torque (during operation partly with changing directions) in order to maintain the set target position of the two rotary parts. If the set target position of the rotary parts should be maintained also when the vehicle is parked, even in this case there would be a need to apply the counter torque, i.e. the drive motor has to be acted upon by a holding energy.

DE 10 2009 031 344 A1 discloses a generic device having a wrap spring brake interposed in driving relationship between the drive motor and the actuating element for camber and/or toe adjustment. Using the wrap spring brake, a torque transmission can be enabled from the drive motor to the actuating element. Conversely, the wrap spring brake blocks a transmission of reaction torques in the opposite direction without external energy.

The structure of the wrap spring brake and the resultant problem will now be described: The wrap spring brake includes on the input side and output side an opening part and a closing part, respectively, which formfittingly engage in both rotation directions with one another in the presence of a circumferential clearance. Moreover, a wrap spring is provided having spring legs, respectively projecting between the opening part and the closing part. The wrap spring brake is configured so as to assume its locking position only after building up a reaction torque that acts from the actuating element in direction of the drive motor, in which locking position a further transfer of the reaction torque is blocked. Such a transition to the locking position is implemented as a result of an expansion of the wrap spring when acted upon by the reaction torque. This generates a friction fit with an outer sleeve, sufficient to prevent a torque transmission to the electric motor. In the DE 10 2009 031 344 A1, the transition of the wrap spring to its locking position is realized only after buildup of the reaction torque so that there is a risk that the reaction torque acts upon the drive motor before reaching the locking position, possibly causing the actuating element to move from its target position.

SUMMARY OF THE INVENTION

Object of the invention is to provide a device for camber and/or toe adjustment, which is able to maintain the set target position of the actuating element in a reliable and simple manner, even when the vehicle is parked.

The invention is based on the recognition that in the prior art the transition of the wrap spring brake to its locking position is implemented only during buildup of a reaction torque. This means that the locking element has not yet assumed its locking position during buildup of the reaction torque, so that a reaction torque can be transmitted, at least in part, onto the drive motor. Against this background, the device according to the characterizing part of patent claim 1 does not have a wrap spring brake as locking element but a double-acting freewheel which opens in the presence of a driving torque of the rotary drive unit and closes in the presence of a reaction torque of the actuating element. Preferably, the freewheel can already in its rest position, i.e. before being acted upon by a reaction torque, lastingly assume its locking position in which a transmission of the reaction torque onto the rotary drive unit is prevented. Against this background, the freewheel has a clamp body unit which holds the freewheel with a predefined locking torque in its locking position, without being acted upon by an external torque, i.e. in the absence of both a reaction torque and a driving torque.

The freewheel can have on its output side a closing part and on its input side an opening part. The closing part and the opening part can engage in both rotation directions within one another in the presence of a circumferential clearance. Preferably, the clamp body unit is associated to the closing part. The clamp body unit may act upon the closing part with the locking torque already in the afore-described manufacturing state of the freewheel.

Only when a driving torque is built-up by the rotary drive unit and additionally exceeds also the opposing locking torque, is the freewheel, i.e. in particular its closing part, capable to move to the release position. Conversely, a self-amplifying effect is established in the freewheel, when the opposing reaction torque is being built-up, that increases the already existing locking torque by the reaction torque.

According to a constructively preferred embodiment, the clamp body unit can have at least one pair of clamp bodies, wherein the clamp bodies can be biased by a spring element on the closing part in circumferential direction in opposition to one another, thereby being urged into a clamping position by the locking torque. In this clamping position, each of the clamp bodies is securely clamped between a raceway, integrated in fixed rotative engagement in the freewheel housing, and a radially outwardly ascending clamping ramp of the closing part.

To unlock the closing part, the opening part can include at least one catch which can be moved via the circumferential clearance between two movement stops of the closing part. The catch of the opening part may additionally include at least one axial web. When impacting the movement stop of the closing part, this axial web is able to push the facing clamp body from its clamping position to its release position.

Once the catch of the opening part has impacted upon the movement stop of the closing part, the opening part jointly with the dynamically coupled closing part continues to rotate. As a result of this rotation movement, also the clamp body which is distal to the axial web of the catch slides from its clamping position to the release position.

When installed, the freewheel is connected in driving relationship on its input side, i.e. the opening part, with a shaft portion leading to the rotary drive unit. On its output side, i.e. the closing part, the freewheel is coupled in driving relationship with a shaft portion leading to the actuating element.

Preferably, the opening part can have several radial catches evenly spaced about the circumference and projecting in recesses of the closing part, respectively. As a result, the formfitting connection in circumferential direction of the opening part and the closing part is realized in a simple manner, wherein the circumferential clearance can be best suited to the driving conditions.

In addition, the clamp bodies can be pushed by elastically biased elements, preferably spring elements, up the clamping ramp (i.e. inclined plane) in order to lastingly apply the locking function. The thus realized friction fit between the clamp bodies, the raceway (or the freewheel housing) and the clamping ramps, causes a clamping and therefore a locking action. Using suitable material and surface pairings of the involved elements, the degree of reaction of the locking action can be advantageously influenced. The clamp bodies have preferably a cylindrical configuration, although any other geometry may also be possible, as known from commercially available freewheels. Moreover, the spring elements may be made of metal, plastic, or elastomers. The spring elements are preferably supported on the output-side closing part, preferably, however, not in opposition to one another.

Finally, to provide a pre-fabricated unit, which is beneficial in terms of manufacture and simple, the shaft portion in driving relationship with the opening part and the shaft portion in driving relationship with the closing part can be arranged within the freewheel housing. The freewheel housing can be connected with the housing of the electric motor.

The advantageous configurations and/or refinements of the invention, as described above and/or set forth in the sub-claims, can—except for example in the cases of unambiguous dependencies or irreconcilable alternatives—find application individually or also in any combination with one another.

BRIEF DESCRIPTION OF THE DRAWING

The invention and its advantageous configurations and/or refinements as well as its advantages will now be described in greater detail with reference to the drawings.

It is shown in:

FIGS. 8 to 11 views depicting the freewheel in different operative states.

DETAILED DESCRIPTION OF PREFERRED EMBODIMENTS

Figure 1:
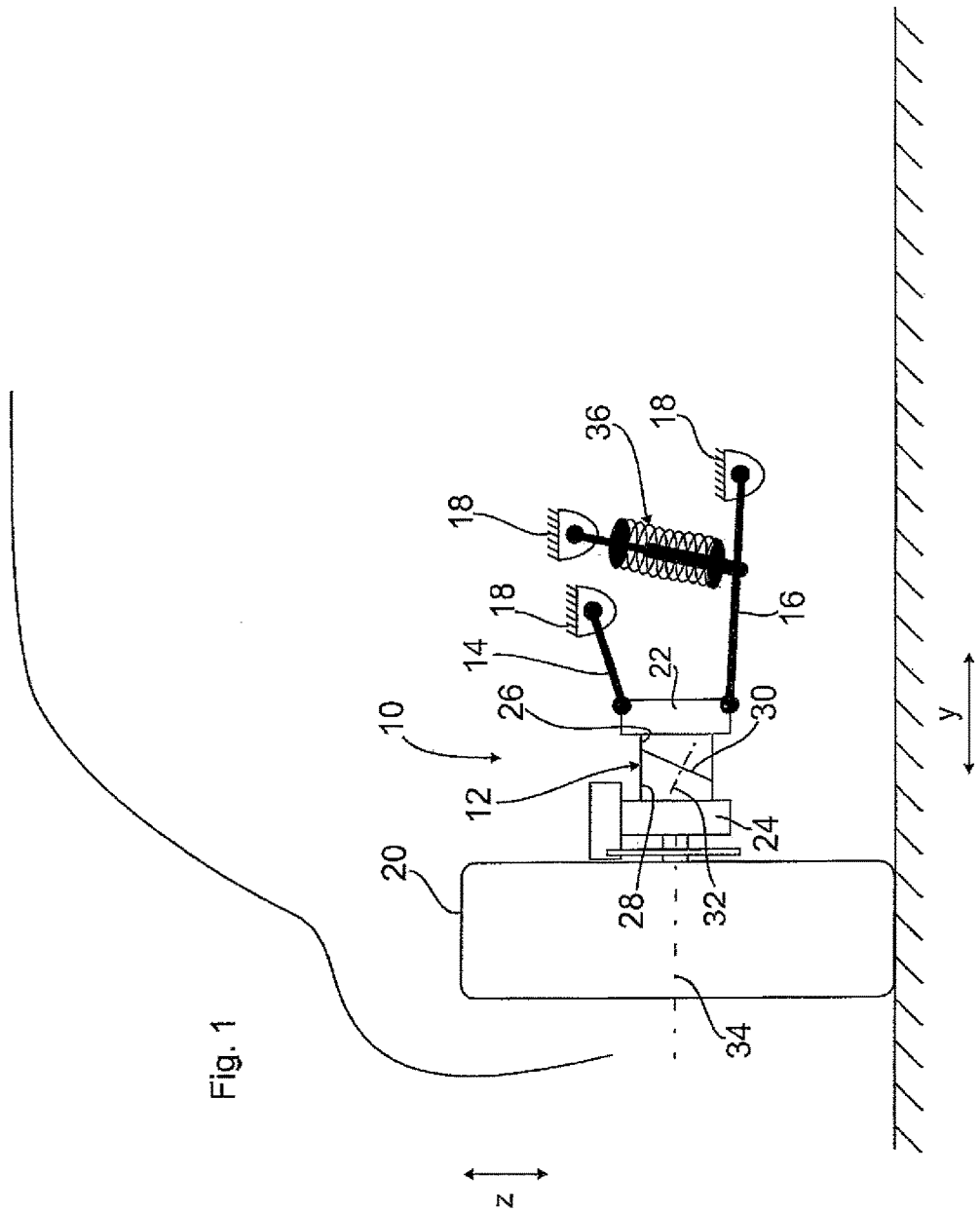
FIG. 1 a wheel suspension of a motor vehicle having a multi-part wheel carrier articulated to wheel guide elements, the vehicle wheel of which can be adjusted via two rotatable actuating cylinders, with the actuating cylinders being each rotatable by an actuator and an electric motor.

FIG. 1 shows a rough schematic representation of a wheel suspension 10 for motor vehicles, in which a wheel carrier 12 is articulated via transverse control arms 14, 16 as wheel guide elements to a structure 18, hinted here only.

The wheel carrier 12 rotatably receiving the wheel 20 is subdivided in a guide part 12 articulated to the transverse control arms 14, 16, a carrier part 24 receiving the wheel 20 via a respective wheel bearing (not shown), and in two rotary parts 26, 28 rotatably mounted on the guide part 22 and on the carrier part 24 and adjustable about a rotation axis 32 which extends perpendicular to confronting slanting surfaces 30. A rotation of one or both rotary parts 26, 28 causes the carrier part 24 to tilt in relation to the wheel rotation axis 34 and thus an adjustment of the toe and/or camber of the wheel 20 of the wheel suspension 10. The wheel load is supported in a manner known per se via a support spring or the suspension strut 36 in relation to the structure 18.

Figure 2:
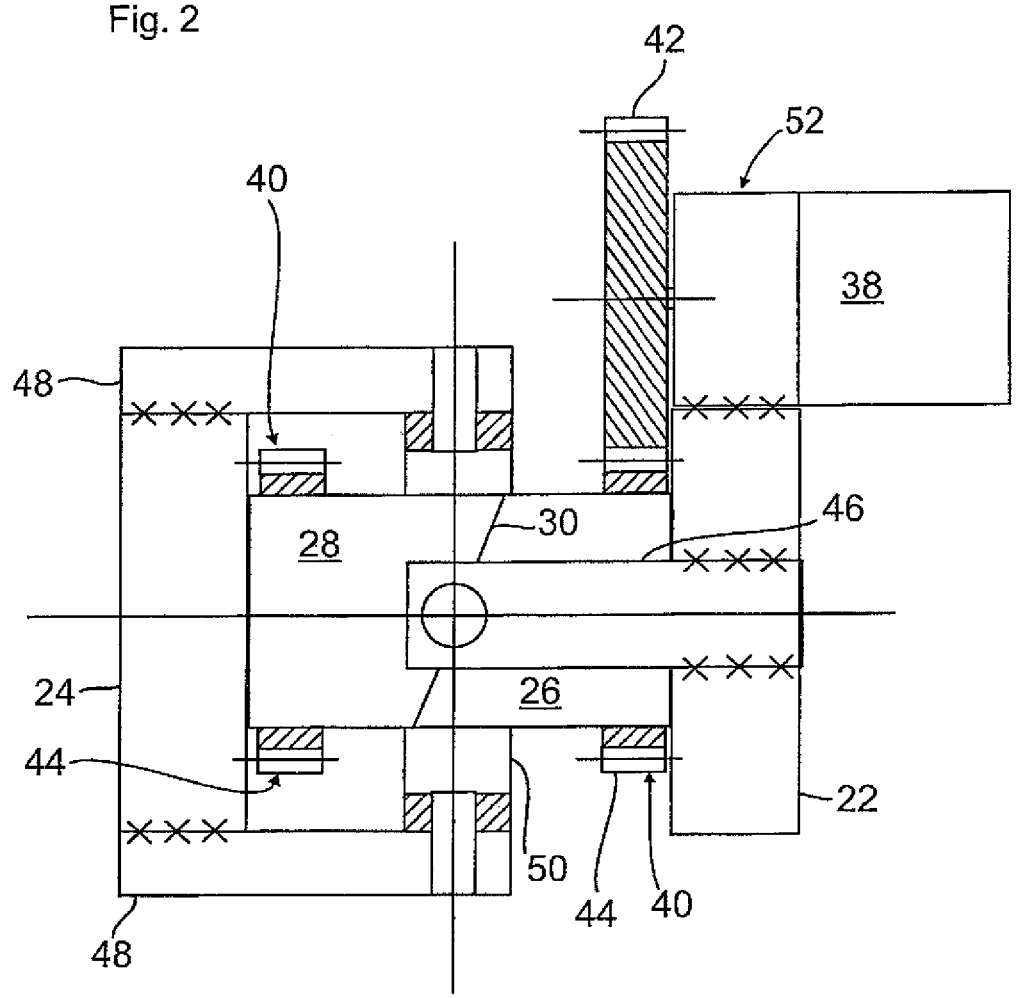
FIG. 2 the wheel carrier of FIG. 1 with a control-arm-side guide part which carries an electric motor, with a double-acting freewheel being arranged between the electric motor and the drive gear of the actuator.
Figure 3:
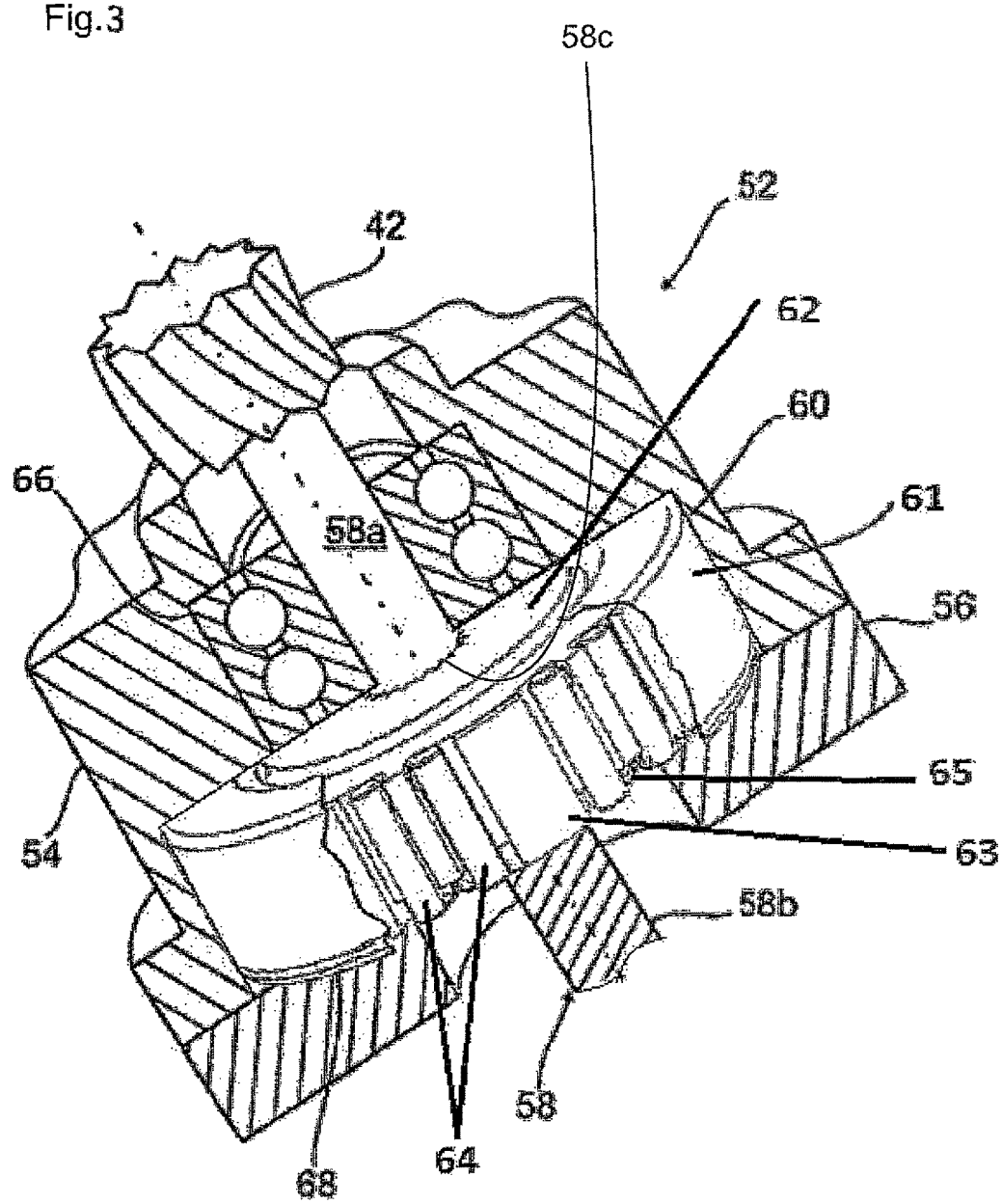
FIG. 3 the driveshaft arranged between the electric motor and a drive gear of the actuator and having a freewheel integrated therein.
Figure 4:
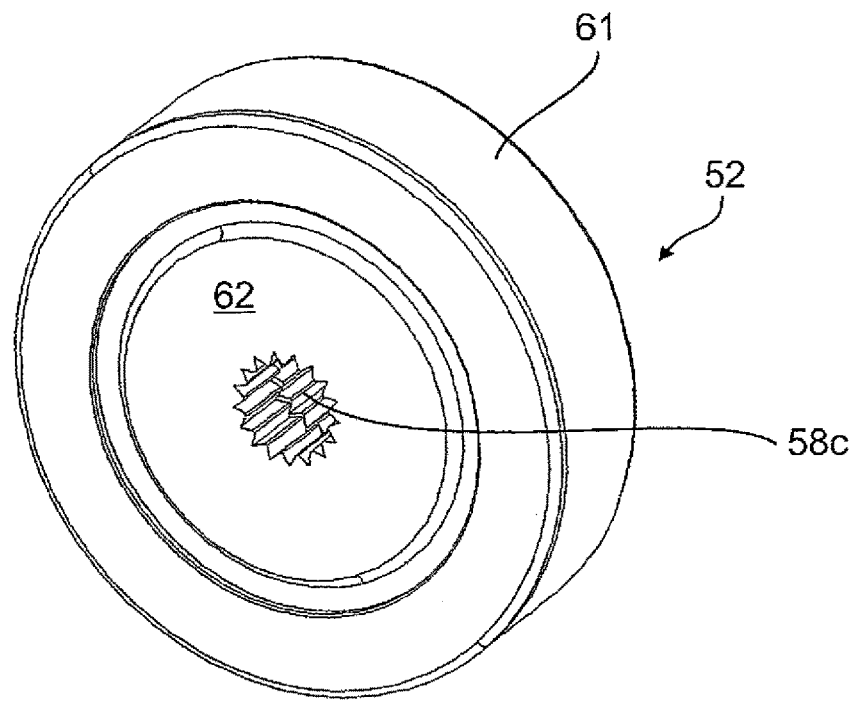
FIG. 4 the freewheel alone.
Figure 5:
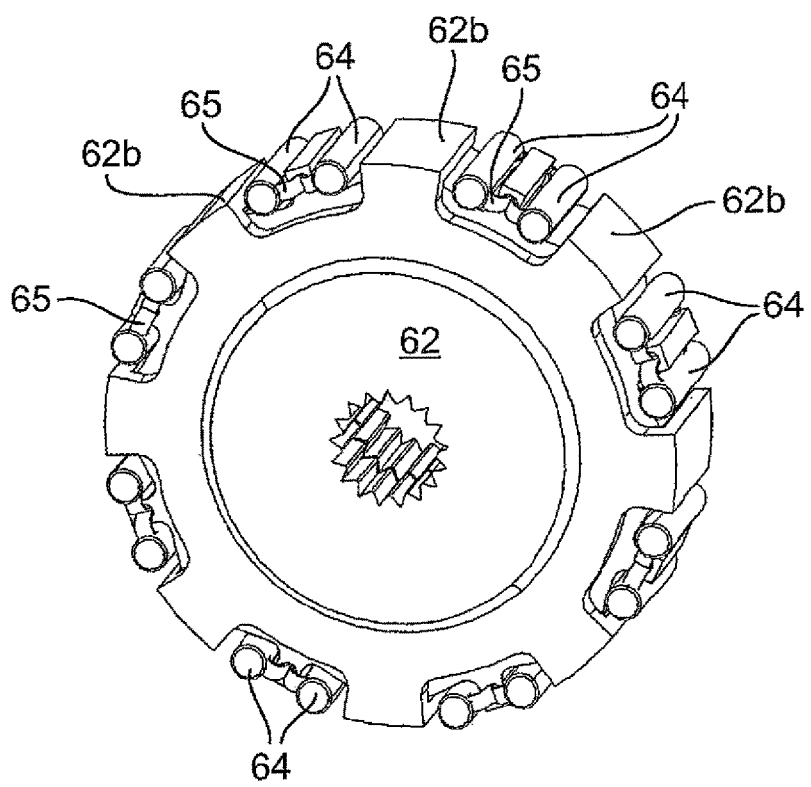
FIG. 5 the freewheel without raceway in a view corresponding to FIG. 4.
Figure 6:
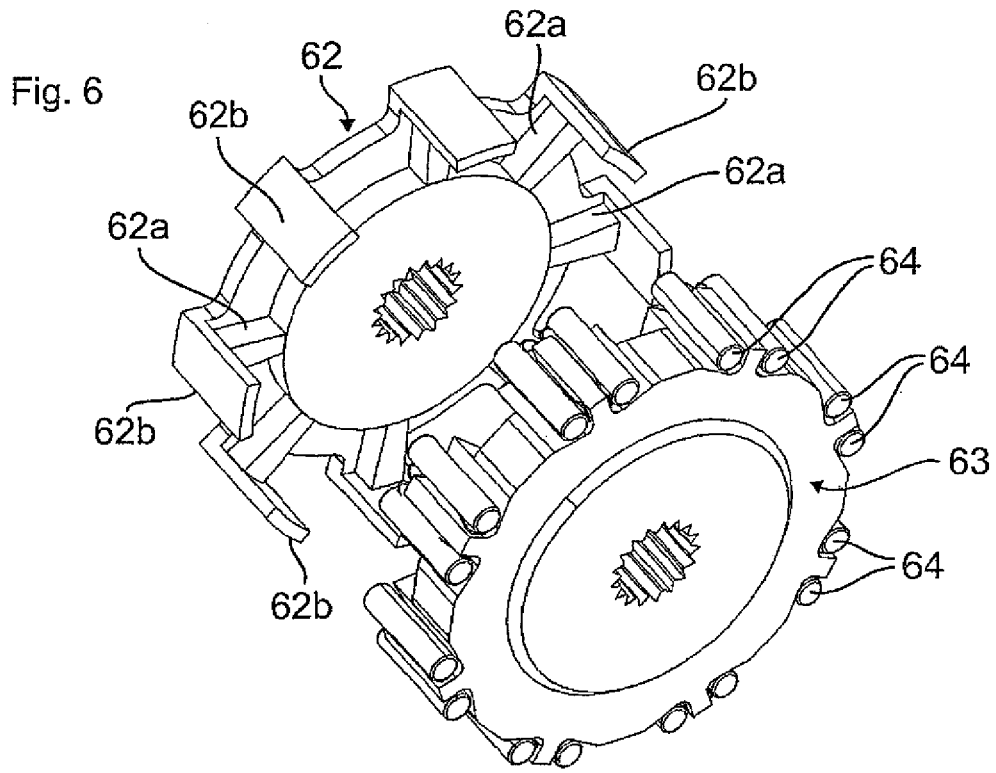
FIGS. 6 and 7 exploded views of the freewheel in various perspective representations.

FIG. 2 shows the actuation of the rotary parts 26, 28 for toe and camber adjustment of the wheel in greater detail. For this purpose, each rotary part 26, 28 is provided with an electric motor 38 (only the electric motor 38 of the guide part 22 is visible), which is mounted to the guide part 22 or the carrier part 24. The electric motors 38 adjustably operate the rotary parts 26, 28 in both rotation directions via spur gear mechanisms or via a driving gear 42 and a gear 44 secured to the rotary parts 26, 28. A gimbal 50 swingably gimbal-mounted to arms 46, 48 is provided for torque support of the carrier part 24 in relation to the guide part 22.

A freewheel 52 acting as locking element is disposed between each of the electric motors 38 and their driving gears 42 (FIG. 2 indicates only a freewheel 52). Structure and operation of the freewheel 52 is illustrated in the following FIGS. 3 to 11 and described. The freewheel 52 enables unimpeded operation of the rotary parts 26, 28 in both rotation directions, while supporting a reaction torque $M_R$ caused by the static and/or dynamic wheel load.

Individual parts of the freewheel 52 are shown with reference to FIGS. 3 to 7 and involve an outer housing 54 and an adapter plate 56 closing off the housing opening, a driveshaft 58 subdivided in two portions 58a, 58b, and a double-acting freewheel system securely placed into the housing 54 and including a radially outer raceway 61 placed in fixed rotative engagement in the housing 54 as well as a closing part 63, an opening part 62, and clamp bodies 64 arranged in pairs, as well as spring elements 65.

The output-side shaft portion 58a of the driveshaft 58 extends through the housing 54 and supports the driving gear 42 of the spur gear mechanism 40, on one hand. On the other hand, the shaft portion 58a is in, not shown, force-transmitting plug connection with a spline 58c of the closing part 63. The input-side shaft portion 58b corresponds to the motor shaft of the not shown electric motor and is also in a plug connection with a spline 58d of the opening part 62. The housing 54 is bolted to the housing of the electric motor 38 via the adapter plate 56. The shaft portion 58a of the driveshaft 58 is rotatably supported in the housing 54 by a double-row roller bearing 66.

As is apparent from FIGS. 6 to 11, the opening part 62 has catches 62a (FIG. 6) converging in the shape of a star in direction of the a rotation axis of the freewheel. The catches 62a protrude into corresponding recesses 63a (FIG. 7) of the closing part 63, such that each catch 62a is able to move about a defined circumferential clearance $s_1$ (FIG. 8) between two opposing movement stops 63b. The catches 62a connect at their radially outer end in hammer-shaped profiled axial webs 62b. In the driving scenario (i.e. in the freewheel position I according to FIG. 11), the axial webs push the confronting clamp bodies 64 down the clamping ramps (i.e. inclined planes) 63c of the closing part 63. Provision is also made for a defined circumferential clearance $s_2$ (FIG. 8) between the axial webs 62b and the clamp bodies 64. The circumferential clearance $s_1$ between the catches 62a and the corresponding recesses 63a is slightly greater than the circumferential clearance $s_2$ between the clamp bodies 64 and the axial webs 62b.

In a rest position (FIG. 8), the spring elements 65 maintain the clamp bodies 64 under slight tension to hold them continuously in the locking position II (FIG. 8). As a consequence, any rotational movement originating from the output side, i.e. the output-side shaft portion 58a, is blocked, as indicated by the crossed-out dashed double arrow.

When powering the electric motors 38 for an adjustment of the rotary parts 26, 28, the electric motor drives the double-acting freewheel 52 in the one or the other rotation direction via the input-side shaft portion 58b. As a result, the electric motor 38 introduces a driving torque $M_A$ (FIGS. 9 to 11) into the freewheel 52 to move it from the locking position II (FIGS. 8 and 9) to the release position I, shown in FIGS. 10 and 11. As a result, the driving torque $M_A$ is transmitted to the rotary part 26.

The introduced driving torque $M_A$ releases the clamp bodies 64 only when exceeding an opposing reaction torque $M_R$ or when their rotation directions are the same. In this case, the axial webs 62b of the opening part 62 are able to push the clamp bodies 64, confronting each other in the rotation direction, down the clamping ramp (inclined plane) 63b, i.e. release them. When the opening part 62 now continues to rotate, the catches 63a thereof impact against the corresponding movement stops 63b of the recesses 63a of the closing part 63 and continue to move them in the rotation direction. As a result, also the clamp bodies 64, facing away from the axial web 62b, become detached and block the other rotation direction. The driving torque is thus transmitted to the output side, i.e. the shaft portion 58a. When reversing the rotation direction, the afore-described process is carried out accordingly vice versa.

Figure 7:
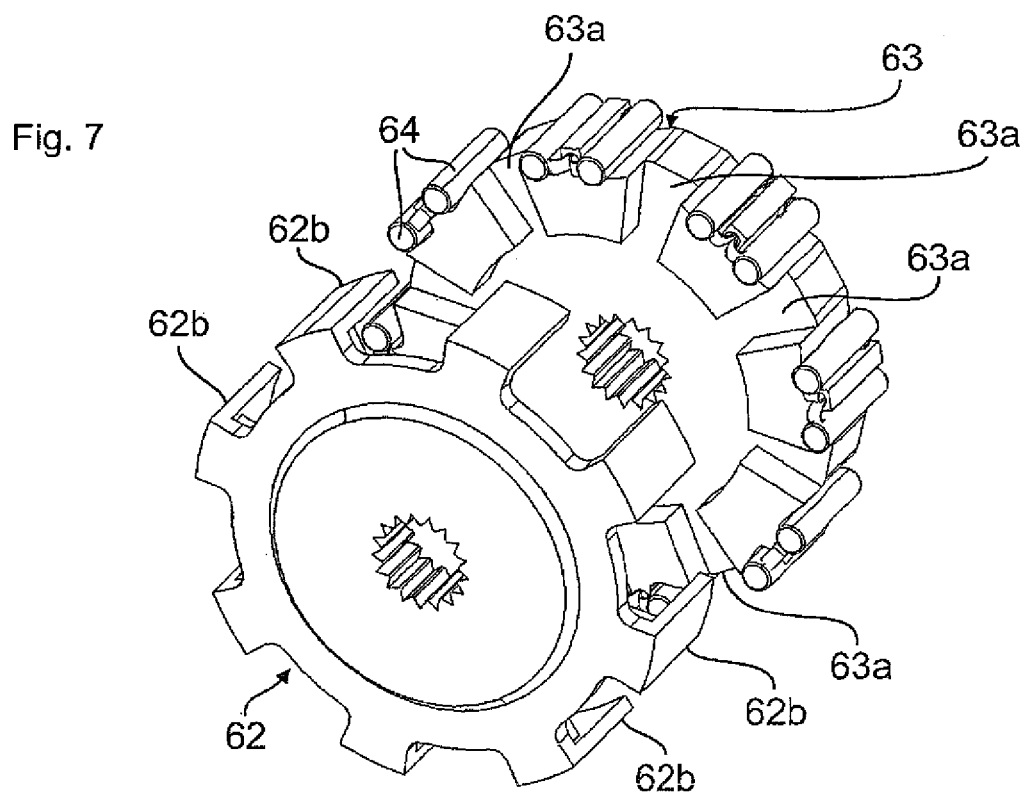

When the electric motor 38 is not activated and does not transmit a driving torque $M_A$, potentially occurring reaction torques $M_R$ from the wheel load, which have an effect via the rotary parts 26, 28 and the spur gear mechanism 40 upon the driveshaft 58, are supported according to FIG. 7 by the clamp bodies 64 via the housing 54.

The reaction torque $M_R$ acts hereby via the driving gear 42, the shaft portion 58a, and the closing part 63 upon the clamp bodies 64 which are held by the spring elements 65 in the locking position at the upper end of the clamping ramps (inclined planes) 63c. In view of the absence of a release by the axial webs 62b, the introduced reaction torque $M_R$ amplifies the locking action, and the double-acting freewheel remains in the locking position II (FIG. 7). The driveshaft 58 with the closing part 63 can thus not be rotated within the housing 54. The same effect also occurs when a torque is encountered in opposite rotation direction.

To increase the transmittable locking torque of the double-acting freewheel 52, as many clamp bodies 64 as possible are dispersed in pairs about the circumference. Materials, surface finish, and pairs of friction values of the clamp bodies 64, the closing part 63 and the opening part 62 are configured depending on calculated stress of the freewheel 52.

What is claimed is:

1. A device for adjusting camber and/or toe of a vehicle wheel, said device comprising:
    a wheel carrier having a wheel-side carrier part which receives the vehicle wheel, and an axle-side guide part which is connected to a wheel suspension;
    at least one actuating element arranged between the wheel-side carrier part and the axle-side guide part and mounted for rotation about a rotation axis;
    a rotary drive unit operably connected to the at least one actuating element to adjust the at least one actuating element for adjustment of the camber and/or toe of the vehicle wheel; and
    a locking element disposed in a driving path between the rotary drive unit and the actuating element and configured to assume a release position in which the driving path is enabled to allow transmission of a driving torque from the rotary drive unit onto the at least one actuating element, and to assume a locking position in which a locking torque is generated in opposition to a reaction torque directed from the actuating element to the rotary drive unit, said locking element being constructed in the form of a double-acting freewheel which opens in the presence of the driving torque generated by the rotary drive unit and closes in the presence of the reaction torque generated by the at least one actuating element.

2. The device of claim 1, wherein the freewheel has a closing part on an output side and an opening part on an input side of the freewheel, with the closing part and the opening part engaging within one another in both rotation directions while defining a circumferential clearance.

3. The device of claim 2, wherein the freewheel has at least one clamp body to keep the closing part with the locking torque in the locking position, when the freewheel is manufactured in the absence of a torque acting upon the freewheel.

4. The device of claim 3, wherein the clamp body is arranged in the closing part of the freewheel.

5. The device of claim 1, wherein the freewheel assumes the release position when the driving torque builds up and exceeds the locking torque acting in opposition to the driving torque.

6. The device of claim 2, wherein the closing part of the freewheel assumes the release position when the driving torque builds up and exceeds the locking torque acting in opposition to the driving torque.

7. The device of claim 1, wherein a self-amplifying effect is established in the freewheel, as the reaction torque builds up, to increase the locking torque by the reaction torque.

8. The device of claim 1, wherein the freewheel has a plurality of said clamp body, said clamp bodies being arranged in pairs.

9. The device of claim 2, wherein the freewheel has a housing forming a raceway, and a plurality of said clamp body, said clamp bodies being maintained under tension on the closing part in a circumferential direction in opposite direction to one another with the locking torque in a clamping position in which each of the clamp bodies is firmly clamped between the raceway and a radially upwardly ascending ramp of the closing part.

10. The device of claim 2, wherein the opening part has at least one catch which is movable across the circumferential clearance between movement stops formed by the closing part.

11. The device of claim 10, wherein the catch of the opening part has at least one axial web, said freewheel having a clamp body proximal to the axial web, said catch pushing with the axial web the clamp body in a direction sufficient for the freewheel to assume the release position, when the catch impacts against one of the movement stops of the closing part.

12. The device of claim 11, wherein the freewheel has a clamp body distal to the axial web, wherein the opening part and the closing part are dynamically coupled to continue to rotate, when the catch of the opening part impacts against the one of the movement stops of the closing part to thereby cause the axial-web-distal clamp body to move from a clamping position to the release position as the opening part and the closing part rotate.

13. The device of claim 1, wherein the freewheel is in driving connection on the input side with a shaft portion sized to extend to the rotary drive unit, and wherein the freewheel is in driving connection on the output side with a shaft portion sized to extend to the actuating element.

14. The device of claim 11, wherein in the locking position of the freewheel, the axial web of the catch is spaced from the clamp body by a circumferential clearance, with the circumferential clearance between the movement stops being greater than the circumferential clearance between the axial web of the catch and the clamp body.

* * * * *